(12) United States Patent
Fiebig

(10) Patent No.: US 6,363,973 B1
(45) Date of Patent: Apr. 2, 2002

(54) DEVICE FOR CLOSING A PIPE AT ITS END SIDE

(75) Inventor: Klaus-Dieter Fiebig, Reinbek (DE)

(73) Assignee: Dockweiler GmbH, Osteinbek (DE)

( * ) Notice: Subject to any disclaimer, the term of this patent is extended or adjusted under 35 U.S.C. 154(b) by 0 days.

(21) Appl. No.: 09/667,914

(22) Filed: Sep. 22, 2000

(30) Foreign Application Priority Data

Sep. 24, 1999 (DE) .......................... 199 47 473

(51) Int. Cl.⁷ ............................................. F16L 55/115
(52) U.S. Cl. ........................... 138/89; 138/90; 138/96 R
(58) Field of Search .................. 138/89, 89.4, 90, 138/96 R

(56) References Cited

U.S. PATENT DOCUMENTS

| 608,613 | A | * | 8/1898 | Linich | 138/89 |
| 2,743,034 | A | * | 4/1956 | Wheatley | 138/89 |
| 3,467,120 | A | * | 9/1969 | Hill et al. | 138/89 |
| 3,990,605 | A | * | 11/1976 | Hanke et al. | 138/90 |
| 5,037,141 | A | * | 8/1991 | Jardine | 138/89 |
| 5,269,342 | A | * | 12/1993 | Portis et al. | 138/89 |
| 5,678,607 | A | * | 10/1997 | Krywitsky | 138/89 |

FOREIGN PATENT DOCUMENTS

DE 296 05 446 5/1996

* cited by examiner

Primary Examiner—James Hook
(74) Attorney, Agent, or Firm—Vidas, Arrett & Steinkraus, P.A.

(57) ABSTRACT

The invention relates to a device for closing a pipe at its end side, particularly for closing the pipe so as to make it highly gas-tight, in order to obtain a simple closure of the pipe without the interior of the pipe not being contaminated when the pipe is removed. The device comprises a socket element one side of which is adapted to be attached to the pipe being closed, a closing element adapted to be placed on top of the other end of the socket element, and a clip for pressing/locking the closing element. The device according to the invention achieves a highly gas-tight metallic seal.

8 Claims, 5 Drawing Sheets

DEVICE FOR CLOSING A PIPE AT ITS END SIDE

CROSS-REFERENCE TO RELATED APPLICATIONS

Not Applicable

STATEMENT REGARDING FEDERALLY SPONSORED RESEARCH

Not Applicable

BACKGROUND OF THE INVENTION

The invention relates to a device for closing a pipe at its end side, particularly for closing the pipe so as to make it highly gas-tight.

In using pipes for conducting media such as a gas it is necessary again and again to close a pipe end. Such a pipe closure, for example, may become required by the fact that a pipe line is intended not to be run on at the moment. It is especially in piping systems which are built by several stages that it becomes necessary to provisionally close pipelines which have been provided for a further extension of the piping system. However, a temporary closure may even be opportune while the system is being manufactured, e.g. to avoid contamination.

For a closure of the piping system, it is known to weld a cap onto the end of the pipe. The drawback of such a closure of a pipe is that metallic chips and contaminations occur when the cap is separated from the pipe end. Such contaminations require expensive preparation prior to a new use of the pipeline, especially for pipes which are employed at semiconductor factories, pharmaceutical plants or other locations of use featuring increased requirements to cleanliness. A time-consuming and high-cost rinsing of the pipeline is often required before the pipeline is put into service again.

Based on the state of the art, it is the object of the invention to provide a device for closing a pipe at its end side which is easy in manufacture, tightly closes the pipe, and can be removed therefrom without leaving any residue.

BRIEF SUMMARY OF THE INVENTION

According to the invention, the object is attained by a device for closing a pipe at its end side, comprising a socket element which is adapted to be attached on one side to the pipe being closed, a closing element adapted to be placed on top of the other end of the socket element, and a clip for pressing the closing element onto the socket element. Such a device is particularly suited for closing a pipe end so as to make it highly gas-tight. The socket element can be attached to the pipe being closed, for example, by welding it thereon. When in its mounted condition, the clip which grips around the socket element presses the closing element onto the socket element. This avoids releasing contaminants (e.g. abraded particles). The advantage of the invention is that after the closing element has been removed more pipes may be connected to the socket element attached, At this point, the socket element may be formed directly in a way such that another pipe may be attached to the socket element, e.g. by orbital welding. The removal of the clip and the closing element is easy with no dirt elements or impurities entering the socket element or pipe.

In an advantageous embodiment of the invention, the socket element and the closing element can be axially locked with each other by means of the clip. The closing element, when in the locked condition, may bear its front-end face against the socket element.

In an advantageous, further aspect of the invention, the socket element has a continuous collar for a better attachment of the closing element. A collar disposed on the socket element serves as a point of application for the clip in pressing on the closing element.

In a particularly simple embodiment of the invention, the closing element has a closing cap. The closing cap has a bottom and a continuous border by which a cavity is defined into which the socket element is introduced when in a closed condition. The closing cap placed on top is connected by the clip to the socket element.

For a better connection to the socket element, the closing cap has a continuous collar at its open end. The continuous collar of the closing cap also serves as a point of clip application again in mounting the closing cap on the socket element.

In a particularly advantageous embodiment of the clip, this one has arranged at its inside a continuous groove which is adapted to engage the collar of the socket element and the collar of the closing cap. Once the closing cap is disposed on the socket element the clip will grip around both the socket element and the closing cap with the respective collars being disposed within the continuous groove of the clip. After the clip has been mounted the socket element is closed by the closing cap.

It is expedient that the collars of the socket element and the closing cap be chamfered at the outsides facing the flanks of the clip groove. Thus, once the closing cap is placed on top of the socket element the two collars, at their sides facing away from each other, define two points of application for the clip, the extensions of which radially taper to the outside to form a tip. When the clip is tightened, which will reduce the inside diameter of the clip, a longitudinal force extending in a radial direction of the socket element will act on these collars because of their chamfered surfaces.

In an embodiment of the inventive device which is capable of producing a particularly large contact pressure the groove of the clip is chamfered accordingly on its flanks facing the collars in order to cause the closing cap to be pressed on when the clip is tightened. While the clip is being tightened, i.e. while its inside radius is tapering, the chamfered flanks of the groove will slide along the chamfered outsides of the collars, thus producing a contact pressure in the axial direction of the socket element.

In a further advantageous embodiment of the invention, the closing element has at least one sleeve element and a closing lid which are adapted to be releasably joined to each other by connecting elements. Unlike in using the closing cap, the closing lid in this embodiment is substantially placed on top of the socket element. The sleeve element serves as a substitute for the continuous border of the closing cap in case of the closing lid.

In a further advantageous aspect of this embodiment, the sleeve element has a continuous collar at one end and an internally disposed continuous groove, which is adapted to engage the collar of the socket element, at its opposite end. In this embodiment of the invention, the groove of the sleeve element is in engagement with the continuous collar of the socket element. For an attachment of the clip, the sleeve element has provided on it a continuous collar which serves as a point of application for the clip.

In an embodiment which is particularly easy to handle, the sleeve element is split axially. The two components are placed on top of the socket element while being in engagement with the continuous collar of the socket element.

It is expedient that the clip have disposed at its inside a continuous groove, which is adapted to engage the collar of the sleeve element and the border of the closing lid as a connecting element. The clip helps in connecting the closing lid and the sleeve element to each other. As a result, a multi-piece sleeve element is retained. The closing lid is attached to the sleeve element via the clip with the sleeve element itself being retained thereon via its groove and the continuous collar of the socket element. In contrast to using a closing cap, tile clip Is close to the end of the socket element in this embodiment of the invention. It is expedient that the collar of the sleeve element and the border of the closing lid be chamfered at their outsides facing the groove of the clips. The interaction of these chamfers serves for deflecting a force applied by the clip in a radial direction into an axial direction in order to cause the closing lid to be pressed against the socket element.

For an intensification of the pressing action, it is opportune to chamfer the groove accordingly on its flanks facing the collar and the border with a view to causing the closing lid to be pressed on when the clip is tightened. Tightening the clip will reduce the inside diameter thereof and the chamfered surfaces of the clip and the collar and those of the border slide into each other, causing the closing lid to be pressed onto the socket element by its front-end face.

To facilitate handling, the clip may consist of two components which are fastened to each other by an articulated member and are can be locked with each other by a bolt. Such a clip makes it easier to mount the closing lid and the sleeve elements so that assembly may be effected by a single person without any extra aid.

In a preferred embodiment, the closing element, the socket element, and the clip are made of metal. Pressing the socket element and the closing cap or the closing lid onto each other axially will produce a metallic seal. Even if the clip is not tightened too strongly pressing metal onto metal may already result in a tightness as is required to close a pipe so as to be highly gas-tight ( $\sim 10^{-9}$ 1 annually). Alloys of a V4A steel have proved to be particularly suitable here, but using silver is possible as well.

BRIEF DESCRIPTION OF THE SEVERAL VIEWS OF THE DRAWINGS

Two embodiments of the invention which are particularly suitable are illustrated in the drawing below.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
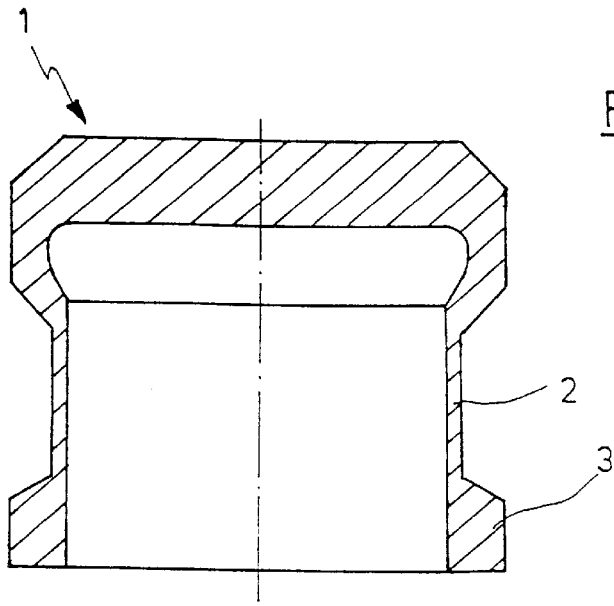
FIG. 1 shows a longitudinal section of a closing cap according to the invention.

FIG. 1 shows an inventive closing cap 1, which has a shank 2. The shank 2 defines a cylindrical cavity for receiving the socket element 4. A projecting collar 3 is disposed at the open end of the closing cap on the continuous collar 5.

Figure 2:
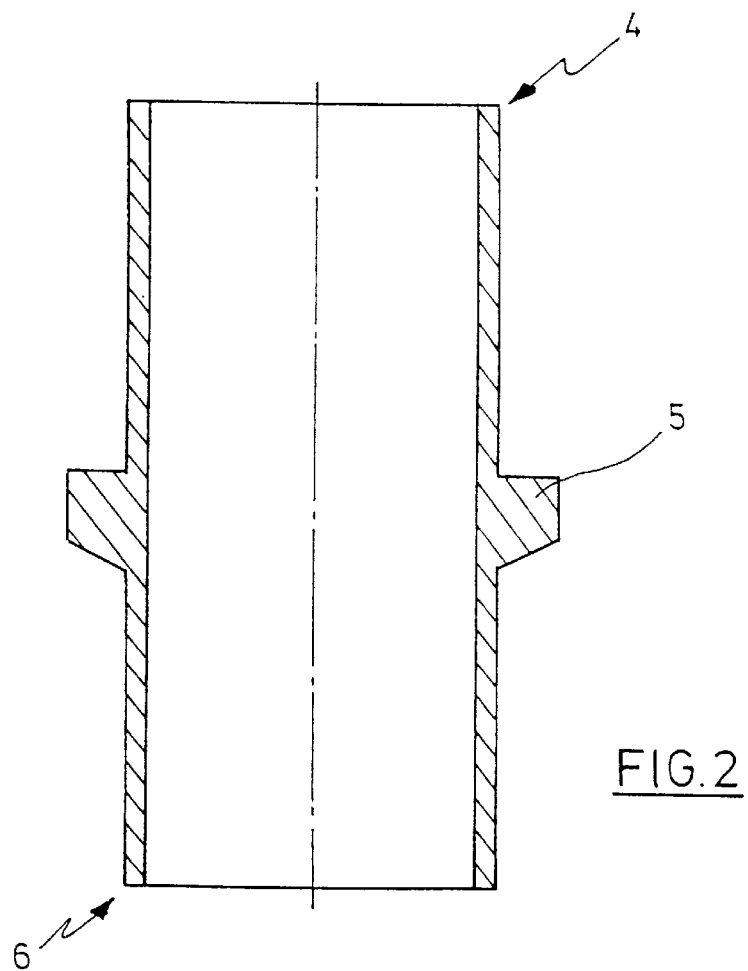
FIG. 2 shows a longitudinal section of a socket element according to the invention, which includes a continuous collar.

A socket element 4 is illustrated in FIG. 2. The socket element 4 is tubular and has a continuous collar 5. It is attached to the pipe being closed (not shown) by means of the end indicated by 6 of the socket element. If the socket element is intended to be attached durably the socket element may be joined to the pipe end by welding. The rest of the pipe is attached to the opposite end of the socket element provided that the socket element is not closed. To this effect, the end of the socket element may have been prepared for orbital welding already.

Figure 3:
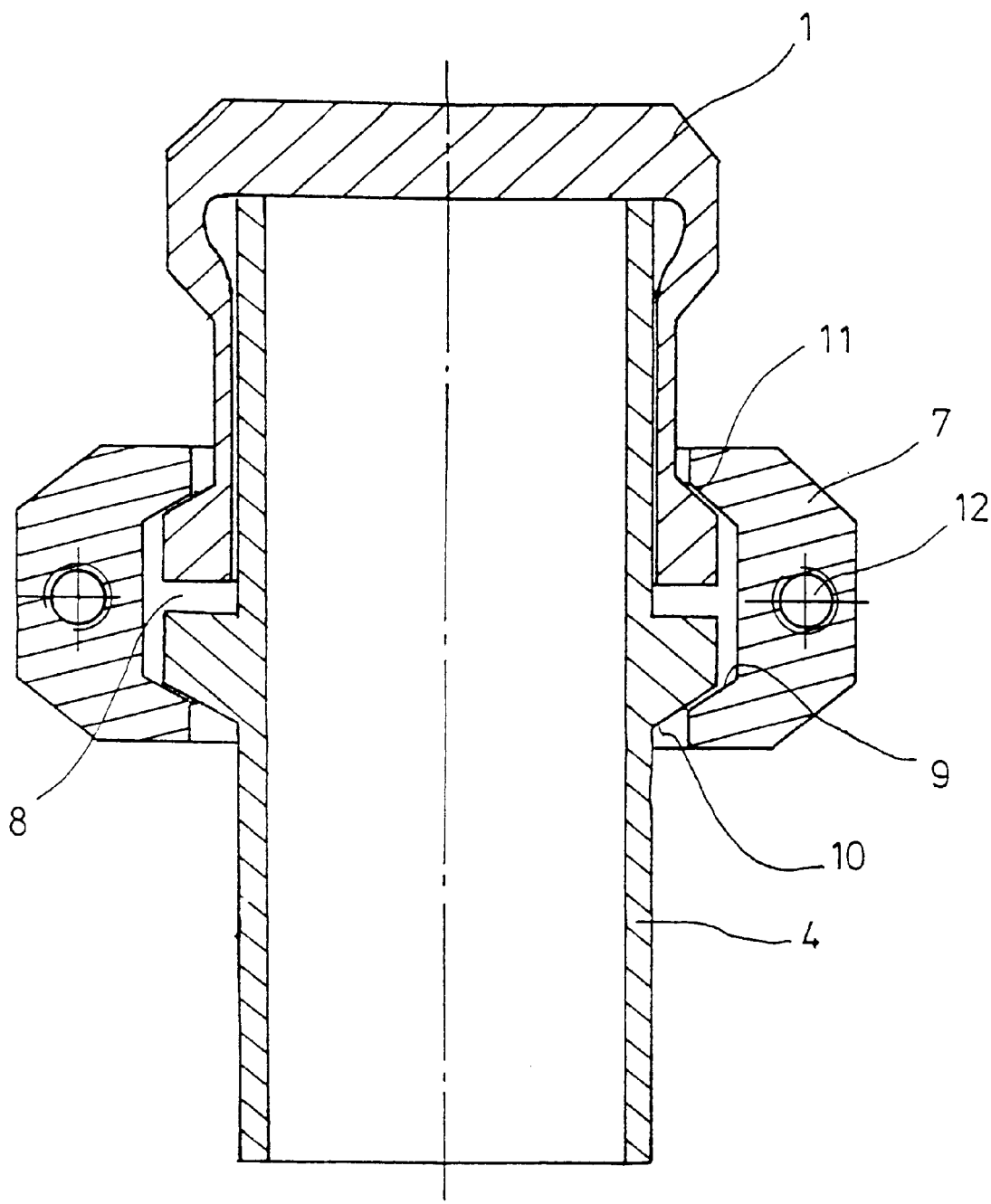
FIG. 3 shows a longitudinal section of a closing cap attached by means of a clip.

If the socket element 4 is in a closed condition the closing cap is placed on top thereof as is shown in FIG. 3. The closing cap is attached to the socket element by means of the clip 7. The clip 7 has an internally positioned groove 8 which is engaged by the collar of the closing cap and the collar of the socket element. When the groove of the clip 7 is in engagement with the collar of the closing cap or the socket element a chamfered flank 9 of the clip will rest on a chamfered outer wall of the collar 10 and 11, respectively. In the embodiment which is shown, the chamfered flank 9 of the groove is disposed in parallel with the chamfered outsides 10 and 11 of the collar. If the inside radius of the clip is reduced the flanks 9 will slide along the walls 10 and 11 of the collars. The clip 7 thus produces a locking effect by which the closing cap is sealingly pressed onto the socket element 4. To achieve the locking effect, it is also possible to select different angles of inclination for the chamfered outer walls 10 and 11 and the chamfered flanks of the clip 7. The socket is sealed here both by the fact that the end of the socket element rests on the cap bottom and that the chamfered flanks 9 bear against the outer walls 10 and 11.

The clip may have two tangentially extending bores for receiving bolts. For this purpose, the bore 8 may be with a female thread in one component or both components of the clip 7. Alternatively, it is also possible to fix the bolts to the clip components via external nuts. Likewise, it is possible to dispose an extra scaling element in the cavity defined between the clip and the closing cap or the closing element.

Figure 4:
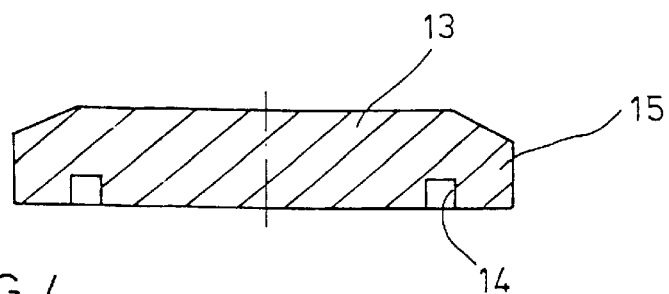
FIG. 4 shows a longitudinal section of a closing lid according to the invention.
Figure 5:
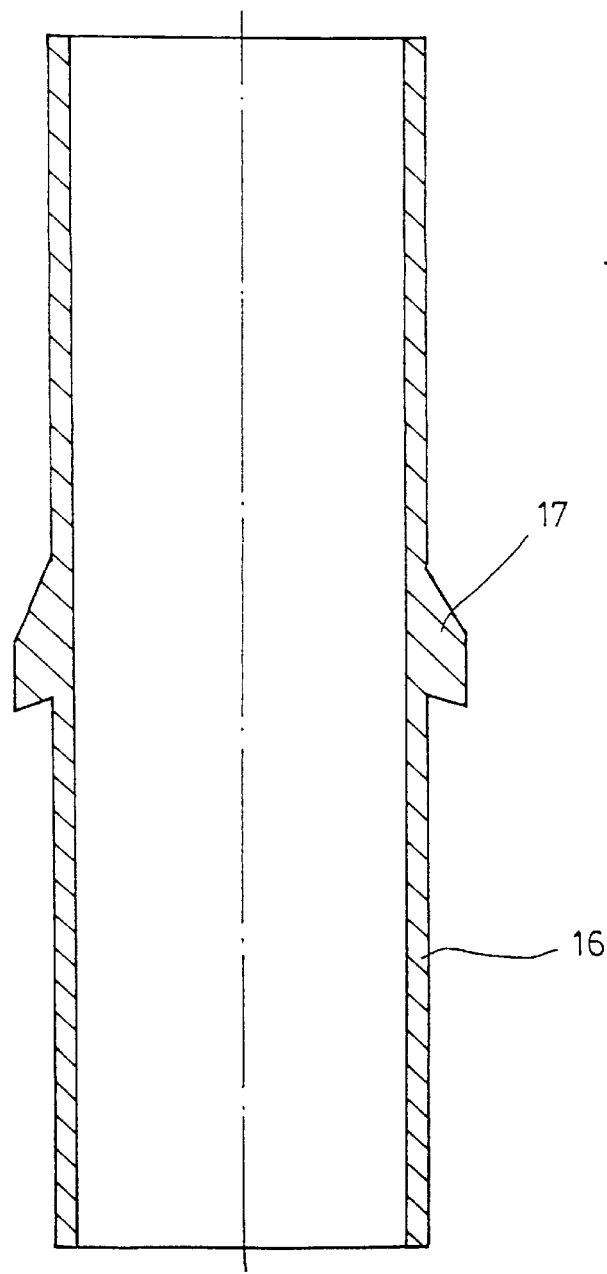
FIG. 5 shows a longitudinal section of a socket element for use with the closing lid of FIG. 4.
Figure 6:
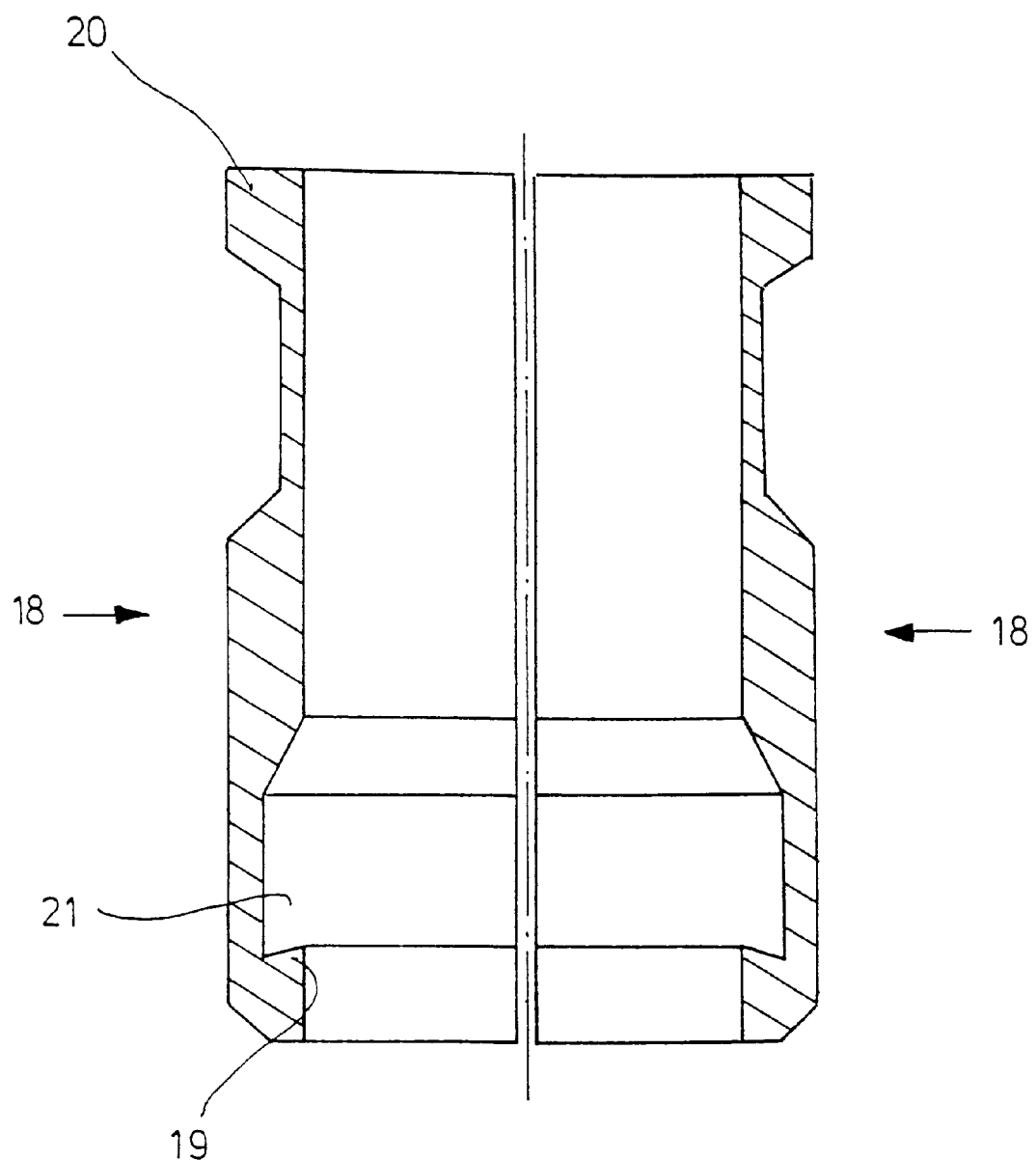
FIG. 6 shows a longitudinal section of a two-piece sleeve element.
Figure 7:
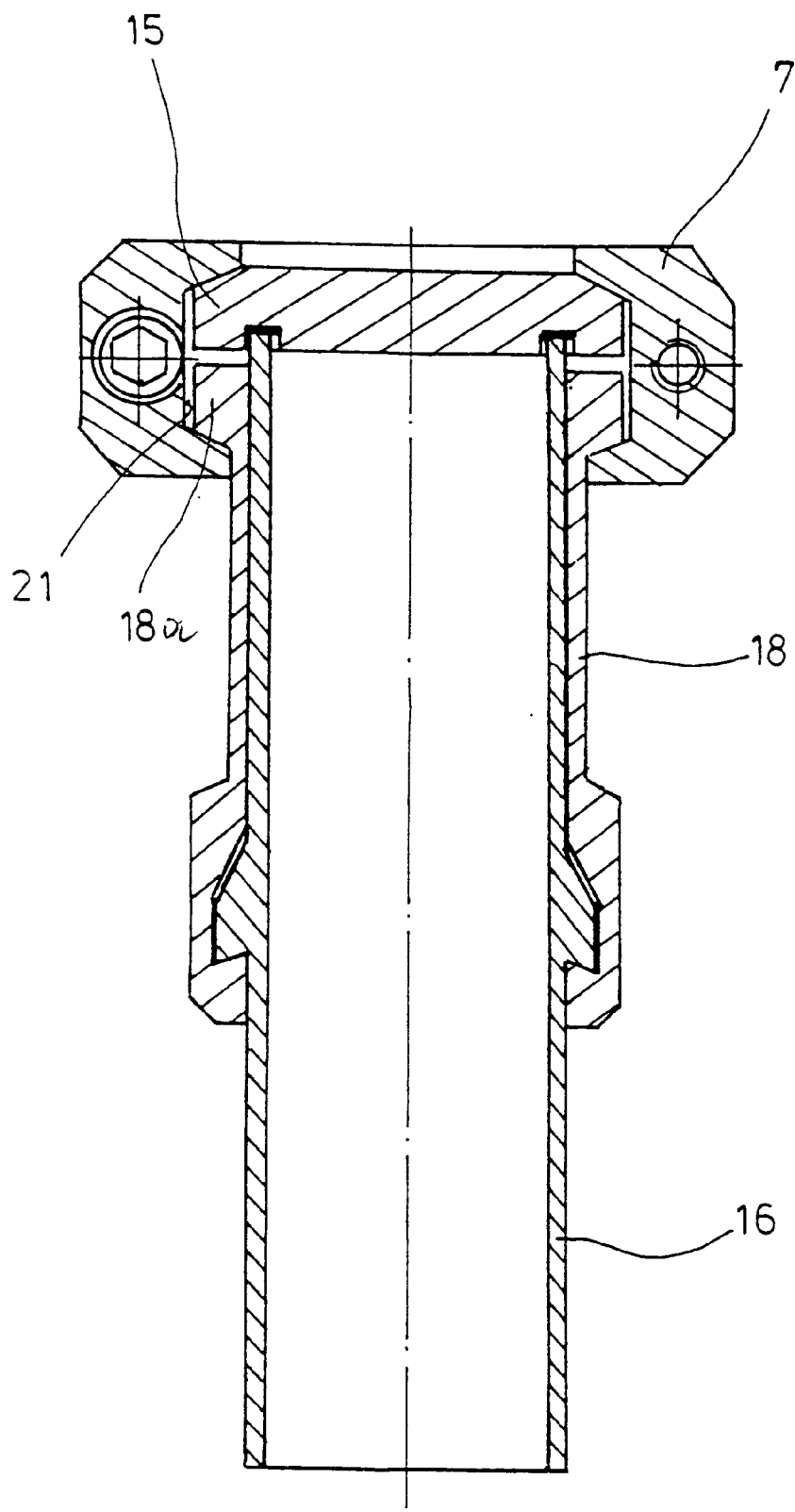
FIG. 7 shows a longitudinal section of a socket element closed by a sleeve element and a closing lid via a clip.

A second embodiment is depicted with reference to FIGS. 4 to 7 wherein identical parts are indicated by identical reference numbers. FIG. 4 shows a closing lid 13. The closing lid 13 has arranged on one side a continuous groove 14 into which the end being closed of the socket element is inserted. The groove 14 is radially followed outwardly by the border 15. The closing lid 13 with its groove 14 is placed on top of the socket element 16. The socket element 16 has a continuous collar which is undercut on one side. The sleeve element 18 shown in FIG. 6 is placed on top of the socket element 18. At this point, the protrusion 19 which is also fitted with an undercut grips behind the collar 17 of the socket element 16. The socket element 16 has a continuous collar 20 at the end which is opposed to the protrusion 19. If the sleeve element 18 is split axially and disposed around the socket element 16 as is shown in FIG. 7 a clip 7, with its internally positioned groove 21, engages with the border 15 of the closing lid and the collar of the sleeve element 18 in order to axially press the closing lid onto the socket element.

Tightening the clip 7 will press the closing lid 13 onto the socket element with the sleeve element 18 being retained on the collar 17 of the socket element 16. In this embodiment, the clip is closer to the pipe end than in the embodiment illustrated in FIG. 3.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. An end-side closure for a pipe comprising:

a metallic socket element (4, 16) having first and second ends, a first end of which is welded onto the pipe being closed and the second end of which is designed for orbital welding onto an adjoining pipe and the metallic socket element including a first oblique surface (10) which is adapted to be at least axially located towards the second end;

a closing element (1,13) adapted to be placed on top of the second end of the socket element (4, 16), which has a sealing surface adapted to bear against the second end of the socket element and includes a second oblique surface (11), and a clip (7) adapted to be drawn together in the circumferential direction including an inner circular groove (8,21) with oblique wall surfaces (9) which interact with the first and second oblique surfaces and press the sealing surface against the second pipe end when the clip (7) is drawn together.

2. The closure according to claim 1, characterized in that the first oblique surface (10) of the socket element is formed as a continuous collar (4,18).

3. The closure according to claim 2, characterized in that the clip (7) consists of two components which are adapted to be locked with each other by at least one bolt.

4. The closure according to claim 1, characterized in that the closing element (1) has a closing cap with a bottom and a continuous border (2) into which the second end of the socket element (4) is adapted to be introduced.

5. The closure according to claim 4, characterized in that the clip (7) consists of two components which are adapted to be locked with each other by at least one bolt.

6. The closure according to claim 4, characterized in that an open end of the closing cap has a continuous collar (3) which includes the second oblique surface.

7. The closure according to claim 6, characterized in that the clip (7) consists of two components which are adapted to be locked with each other by at least one bolt.

8. The closure according to claim 1, characterized in that the clip (7) consists of two components which are adapted to be locked with each other by at least one bolt.

* * * * *